March 22, 1966 D. L. KENAGA 3,242,004
METHOD OF POLYMERIZING TRIS-(1-OZIRIDINYL)-PHOSPHINE
OXIDE WITHIN WOOD AND RESULTANT PRODUCT
Filed April 3, 1963
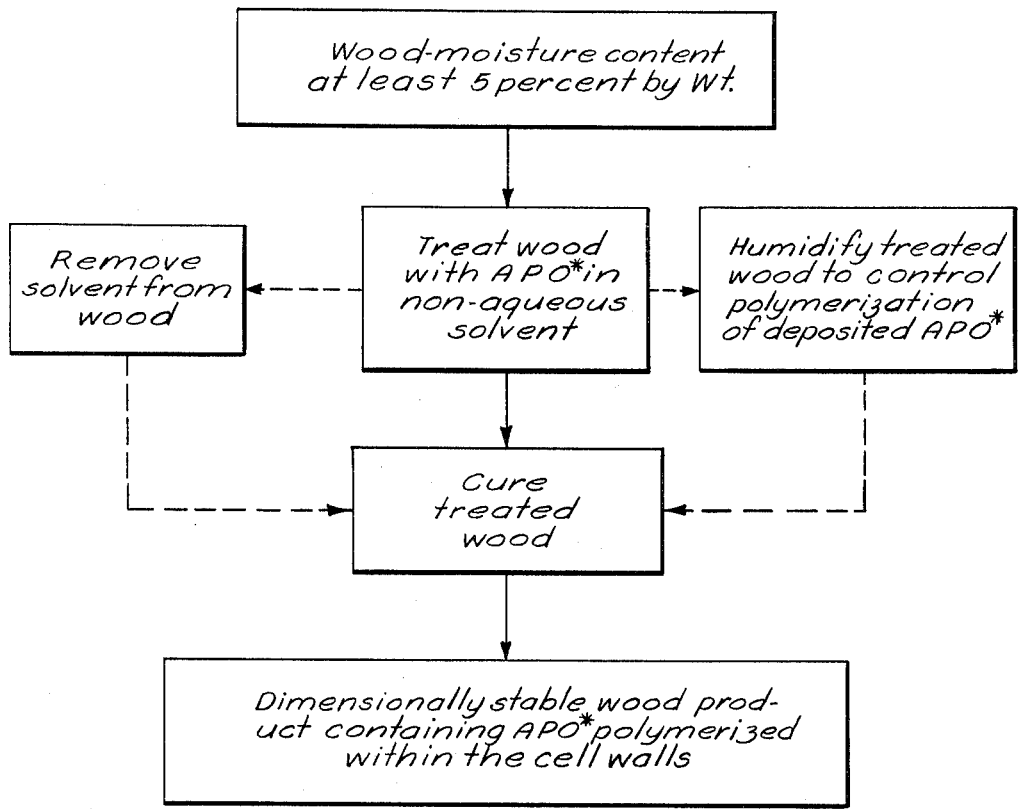
Fig. 1  * tris(1-aziridinyl) phosphine oxide
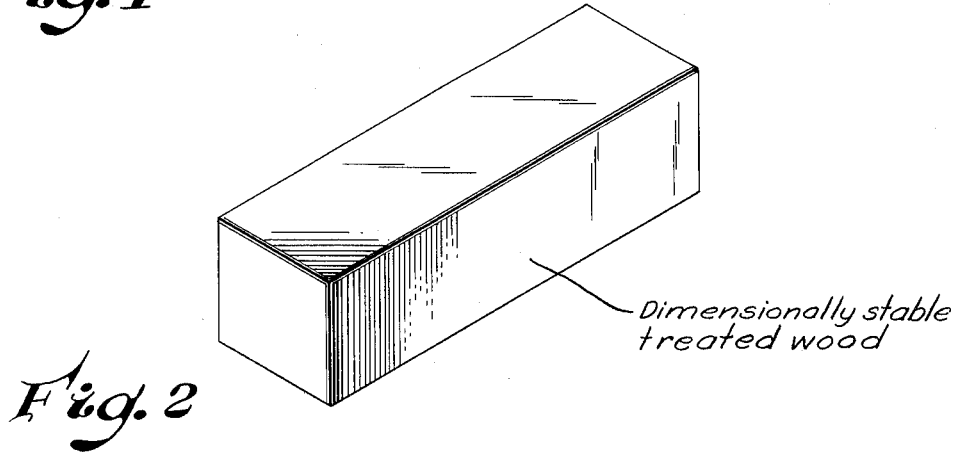
Fig. 2
INVENTOR.
Duane L. Kenaga
BY Lewis C. Brown
ATTORNEY

United States Patent Office 3,242,004
Patented Mar. 22, 1966

3,242,004
METHOD OF POLYMERIZING TRIS-(1-OZIRIDI-NYL)-PHOSPHINE OXIDE WITHIN WOOD AND RESULTANT PRODUCT
Duane L. Kenaga, Midland, Mich., assignor to The Dow Chemical Company, Midland, Mich., a corporation of Delaware
Filed Apr. 3, 1963, Ser. No. 270,159
4 Claims. (Cl. 117—136)

This invention relates to dimensionally stable wood products and to methods for the manufacture of such products.

It is well known that the exterior dimensions of wood vary with the moisture content of the wood. This variation in size due to moisture content has limited the uses of untreated wood. Furthermore, this problem has generated a wide variety of chemical and physical treatments for wood, most of which are specialized and depend upon the intended use of the wood.

Three general methods have been employed for the stabilization of wood against dimensional changes: (1) coating, (2) deposition of bulking agents in the cell walls, and (3) providing molecular cross-links within the wood to prevent the wood from swelling.

Bulking is a method of replacing the water within the wood with a material that may or may not react within the wood. The degree of bulking depends upon the specific volume of the material deposited. Several known bulking methods ars disclosed in U.S. Patent No. 2,811,-470 to Kenaga. In the bulking method, dimensional stability is achieved by replacement of water within the cell walls with the stabilizing material.

To deposit such a material in the cell wall requires that the wood be in the green (swollen) condition. This may be ordinarily achieved by treatment of the unswollen wood with a polar wood swelling agent which acts as a carrier for the stabilizing agent. The polar solvent most commonly used is water. The water causes an increase in swelling due to the entry of the water into the fine capillary structure of the cell walls. This swelling occurs until the fiber saturation point is reached (usually between about 25 percent to 35 percent moisture content, depending upon the kind of wood). Above the fiber saturation point, the moisture is present within the cell lumen or the coarse capillary structure of the wood.

It is known, however, that certain types of stabilizing agents tend to polymerize in the presence of water. Treatment of wood with a water solution of such a substance is, therefore, unsatisfactory because of the short working life of such solutions. The treating substance polymerizes in the water and the polymer molecules become so large that they cannot readily diffuse into the fine structure of the cell wall. It has been found that many substances which polymerize in water are strongly absorbed from a hydrophobic solution into the water phase when the hydrophobic solution is contacted with water. If the treating substance: (1) does not polymerize in a hydrophobic solution, (2) may be selectively extracted from a hydrophobic solution by water, and (3) will polymerize in water, then this substance can be deposited in the cell walls of the wood according to the process of the present invention. To accomplish this, the wood is first treated with a hydrophobic solution containing the treating agent. This solution penetrates only the cell lumen or voids. The treating agent is then selectively extracted from the solution (located in the cell voids) by the water which is located in the cell wall. Once in the water phase, the treating agent polymerizes.

Among the advantages of this treating process are the following: (1) the treating agent is located in the polymerized form where it is needed (in the cell walls, not in the cell lumen), (2) a solution of the treating agent in a hydrophobic solvent will be stable for long periods and may be reused (because no polymerization occurs), and (3) solvents or mixtures of solvents with various boiling points (especially low boiling points) may be used.

It is an object of the present invention to provide a dimensionally stable wood product. A further object of the invention is to provide a process for treating wood which renders the treated wood impervious to swelling and bulking caused by moisture.

These and other objects may be accomplished by treating wood which has a controlled, predetermined moisture content above about five to seven percent (based upon the total weight of the oven-dried wood plus moisture) with tris-(1-aziridinyl)-phosphine oxide (designated as APO) in a substantially water-free hydrophobic solvent.

FIGURE 1 of the drawing is a flow diagram illustrating the invention.

FIGURE 2 of the drawing illustrates a typical dimensionally stable wood article obtained according to the invention.

Attempts to treat wood using aqueous solvents will result in polymerization of APO before the APO has impregnated the wood. Furthermore, the moisture content of the wood cannot be controlled with aqueous systems. By using an essentially anhydrous hydrophobic solvent and adjusting the moisture content of the wood to from about 5–7 percent (by weight) up to the full saturation point of the wood, the wood is impregnated with APO solution. With low density woods (such as pine), the moisture content may be as high as 250 percent. The water within the wood then polymerizes the sorbed APO. The polymerization may be carried out by humidifying the impregnated wood (usually with an initial moisture content of about 5 to 7 percent) for several days to increase the moisture content and simultaneously polymerize APO within the wood, followed by curing and drying the wood in the vapor of a nonpolar solvent. The polymerization can also be carried out by soaking the wood (usually with a moisture content of from about 10 percent to 20 percent by weight) for about 1–2 to 35 minutes in a solution of APO in a non-aqueous solvent followed by vapor-curing and drying of the treated wood. The impregnation time may vary from a few minutes to several days, depending upon the relative size of the wood to be treated. The wood product which is obtained by the process of the invention contains from 5 percent to 50 percent by weight of APO (preferably from 10 percent to 30 percent by weight) which has been reacted and/or polymerized in situ so as to form both chemical and physical bonds with the wood fibers.

By controlling the amount of moisture in the wood and employing APO in a hydrophobic (usually nonpolar) water-free solvent, a wood product with excellent dimensional stability is obtained. Only a relatively small amount (5 to 50 percent by weight) of APO (based on the oven dry weight of the wood treated) is consumed in the process and excessive bulking or swelling of the wood is avoided. The amount of APO polymerized within the wood can be precisely controlled by pre-treating the wood to provide any desired initial moisture content.

In the process of the present invention, wood is pre-treated to bring the moisture content above about five to seven percent (based on the total oven dry weight of the wood plus water). This pre-treatment may require the amount of moisture in the wood to be increased or decreased, depending upon the original moisture content of the wood. The wood is then impregnated with a 1 to 25 percent (by weight) solution of APO in a hydrophobic solvent such as xylene, toluene, benzene, 1,1,1-trichloroethane or other hydrocarbon or halohydrocarbon solvent. Any inert solvent which does not react with APO may be used. Examples of other non-aqueous solvents which may be used include compounds or mixtures with boiling points below about 150° C. such as carbon tetrachloride, chloroform, ethylene dichloride, ethylene dibromide, perchloroethylene, trichloroethylene, mixtures of: (1) carbon tetrachloride, (2) ethylene dibromide, and (3) ethylene dichloride, mono- and polychlorobenzenes, aliphatic naphthas, gasoline, naphthenic naphthas such as aromatic mineral spirits, n-butane, n-pentane, iso-pentane and ethylbenzene.

The impregnation step can be carried out by several methods known in the art of wood treatment. For example, the pre-treated wood may be simply immersed in the APO solution and the excess hydrophobic solvent removed by vacuum distillation. Another impregnating method comprises holding the wood under vacuum (5–10 mm. Hg) for about five to fifteen minutes, immersing the wood completely in the APO solution while under vacuum, releasing the vacuum, and soaking the wood in the APO solution for from five minutes to about an hour. The total impregnating time may vary from one or two minutes to two days at temperatures of from 10° to 90° C. The impregnated wood is then cured (after removal of the solvent) by heating for about 3 to 24 hours at temperatures of from about 45° to 150° C. The impregnated wood may also be cured by contact with hot circulating vapors of a hydrophobic solvent which may be the same as, or different from, the solvent used to impregnate the wood.

The use of APO solutions in hydrophobic solvents results in a very significant decrease in the amount of APO retained by the wood for a given degree of dimensional stability when the moisture content of the wood is controlled. The moisture content of the pre-treated wood is preferably above about 5–7 percent (by weight) when APO solutions of from 5 to 25 percent (by weight) are employed in an essentially water-free hydrophobic solvent. Wood with a moisture content of from 5 to 35 percent by weight is suitable. With APO solutions of from 10 to 15 percent by weight, the moisture content of the pre-treated wood is generally kept between 5 percent and 25 percent by weight in order to prevent excessive (greater than 35 percent by weight of APO per total weight of treated wood) retention of APO in the wood.

The process of the present invention is applicable to any species of wood. Examples of kinds of wood which may be treated by this process include the softwoods such as the pines (southern pines, ponderosa pine) and the hardwoods such as maple and oak. Other woods which may be treated are: aspen (*Populus tremuloides*), redwood (*Sequoia sempervirens*), red oak (Quercus species), rock elm (*Ulmus racemasu*), spruce (*Picea engelmanii*) and Douglas fir (*Pseudotsuga Taxifolia*). The resistance of the treated wood to dimensional changes caused by moisture is permanent. Water does not remove the APO which is deposited (cross-linked and/or polymerized) within the wood. In addition to dimensional stability, the APO treatment produces a non-hygroscopic, nonleachable, flame-resistant wood product which resists biological attack. Wood which has been treated according to the process of the present invention so that the retention of APO is about 10 percent to 15 percent by weight is not attacked by *Lenzites trabea*, a wood rot organism.

The following examples are submitted for the purpose of illustration only and are not to be construed as limiting the scope of the invention in any way.

EXAMPLES I–VIII

Ponderosa pine sapwood (*Pinus ponderosa* Laws) was cut into wafers 2 inches tangentially by 1⅜ inches radially, by ¼ inch longitudinally with the grain. The specimens were prepared from clear stock, free of defects, and averaged about 30 rings per inch. For the purpose of laboratory control of the treatment process, all wafers were extracted for four days at room temperature with an azeotropic mixture of methanol and trichloroethylene to remove pitch and other extractives. The solution was continuously removed, extractives separated, and the azeotrope returned for further extraction.

The wafers were held under a vacuum of from 5 to 10 mm. of Hg for a ten-minute period followed by complete imersion in a solution of tris-(1-aziridinyl)phosphine oxide in xylene. After complete immersion, the vacuum was released and the wafers were kept immersed in the treating solution in a refrigerator at 40° F. overnight (about 18 hours). The wafers were then removed, placed in a hood until a xylene evaporated, and cured for 16 hours at 110° C. in a forced air oven. The results of the treatment using a 3 percent and a 12 percent by weight solution of APO in xylene are recorded in Table 1. Wafers with different moisture contents were employed, as indicated in Table 1.

*Table 1.—Treatment of wood at various moisture contents with APO in xylene*

| Example Number | Concentration of APO in treating solution (percent) | Moisture in wood (percent) | Retention of APO in wood (percent) | Antishrink efficiency |
|---|---|---|---|---|
| I | 3.0 | 0.7 | 3.2 | −4.1 |
| II | 3.0 | 7.5 | 3.3 | −1.3 |
| III | 3.0 | 12.2 | 7.9 | 2.3 |
| IV | 3.0 | 28.3 | 20.7 | 45.4 |
| V | 12.0 | 0.4 | 13.1 | 5.0 |
| VI | 12.0 | 7.6 | 15.6 | 9.5 |
| VII | 12.0 | 11.5 | 25.4 | 37.2 |
| VIII | 12.0 | 26.9 | 56.1 | 59.0 |

The concentration of APO in the treating solution, moisture in the wood and retention of APO in the wood are weight percentages. The term "oven dry" refers to wafers heated at 100° C. for 16 hours. The percent retention is based upon the oven dry weight of untreated wood carried through the experiment. Antishrink efficiency (A.E.) is a measure of the dimensional stability of the treated block as compared with an untreated block and is defined as follows:

$$\frac{\text{Percent antishrink}}{\text{efficiency (A.E.)}} = \left(\frac{C-D}{C}\right) \times 100$$

wherein C represents percent tangential swell of control block and D represents percent tangential swell of treated block.

Table 1 shows that the retention of APO in the wood is a function of the moisture content of the wood and the concentration of the APO in the treating solution. By controlling the amount of moisture in the wood prior to impregnation of the wood with APO, the amount of APO absorbed into the water phase from the solution is varied. This variation is indicated by the retention. Excellent antishrink efficiencies are obtained with retentions of 20 percent APO and above.

EXAMPLES IX–XXIII

Ponderosa pine sapwood wafers prepared as in Examples I–VIII with various moisture contents were impregnated with a 12 percent (by weight) solution of APO in xylene. The samples were given the vacuum treatment as in Examples I–VIII (held under a 10 mm. Hg vacuum for about 10 minutes) and then were allowed to soak in the APO solution for periods of time varying from 15 minutes to 24 hours. Other samples were removed from the APO solution and sealed in bottles to allow diffusion from the cell voids for periods of 4 hours and 24 hours. All of the samples were cured in xylene vapors by hanging the wafers in a chamber pre-heated to 138°–140° C. and connected to a boiling flask of xylene for 4 hous. The results are summarized in Table 2. The swell of the control block in a water-soaked condition is compared with the swell of the treated block after the same water soaking procedure.

*Table 2.—Treatment of wood at various moisture contents with APO in xylene vapor cure*

| Example Number | Moisture of wood (percent) | Type of impregnation | Retention of APO in wood (percent) | A.E. |
|---|---|---|---|---|
| IX | 11 | 15 min. soak | 15 | 44 |
| X | 11 | 4 hr. soak | 21 | 52 |
| XI | 11 | 24 hr. soak | 30 | 58 |
| XII | 11 | 4 hr. sealed | 16 | 45 |
| XIII | 11 | 24 hr. sealed | 17 | 47 |
| XIV | 19 | 15 min. soak | 17 | 47 |
| XV | 19 | 4 hr. soak | 31 | 59 |
| XVI | 19 | 24 hr. soak | 46 | 62 |
| XVII | 19 | 4 hr. sealed | 19 | 51 |
| XVIII | 19 | 24 hr. sealed | 20 | 52 |
| XIX | 23 | 15 min. soak | 19 | 47 |
| XX | 23 | 4 hr. soak | 33 | 60 |
| XXI | 23 | 24 hr. soak | 44 | 64 |
| XXII | 23 | 4 hr. sealed | 20 | 50 |
| XXIII | 23 | 24 hr. sealed | 20 | 51 |

Table 2 shows that excellent antishrink efficiencies (A.E.) (40–65 percent) are obtained with retentions of from 15 to 45 percent using wood with initial moisture contents of from 10 to 25 percent.

EXAMPLES XXIV–XXIX

Using wood blocks as in the preceding examples but with a moisture content of 13.5 percent, the percent retention of APO from various concentrations of APO in toluene was determined. As in the preceding examples, the wood was vacuum impregnated followed by a 15 minute immersion in a solution of APO in toluene. A toluene vapor cure was used by hanging the impregnated blocks in a chamber preheated to 110° C. and connected to a boiling flask of toluene (110° C.) for 4 hours. The results are recorded in Table 3.

*Table 3*

| Example Number | Concentration of APO in treating solution (percent) | Retention of APO in wood (percent) | A.E. (Antishrink efficiency) |
|---|---|---|---|
| XXIV | 4 | 6.5 | 15.6 |
| XXV | 8 | 11.6 | 27.3 |
| XXVI | 12 | 15.8 | 37.6 |
| XXVII | 16 | 18.3 | 38.6 |
| XXVIII | 20 | 23.0 | 46.6 |
| XXIX | 24 | 25.5 | 48.1 |

EXAMPLES XXX–XXXIV

Wafers of Ponderosa pine sapwood with various initial moisture contents were treated with a 12 percent solution of APO in xylene. In a manner similar to that described in the preceding examples, the wood was initially vacuum impregnated followed by a 15 minute immersion in a solution of APO in xylene. The impregnated wafers were vapor cured with xylene for 4 hours at 138–140° C. and the percent retention of APO determined. The blocks were then leached for seven days in running distilled water and the percent retention of APO for the leached blocks again determined. The results are tabulated in Table 4.

*Table 4*

| Example Number | Soaking period, 12 percent APO in xylene | Moisture content of wafer when impregnated with APO solution | Retention of APO in wood (percent) prior to leaching | Retention of APO in wood (percent) after leaching |
|---|---|---|---|---|
| XXX | 15 min | 11 | 12.1 | 12.6 |
| XXXI | 15 min | 19 | 14.3 | 14.3 |
| XXXII | 24 hours | 19 | 38.2 | 36.9 |
| XXXIII | 15 min | 23 | 15.1 | 14.9 |
| XXXIV | 24 hours | 23 | 37.6 | 36.5 |

Table 4 indicates that virtually none of the APO deposited in cross-linked and/or polymerized form within the wood is removed by water.

EXAMPLES XXXV–XL

The procedure used in Examples XXIV–XXIX was repeated using xylene in place of toluene. The results are recorded in Table 5. The wood had a moisture content of 13.5 percent.

*Table 5*

| Example Number | Concentration of APO in treating solution (percent) | Retention of APO in wood (percent) | Antishrink efficiency |
|---|---|---|---|
| XXXV | 4 | 7.6 | 23.8 |
| XXXVI | 8 | 12.7 | 40.0 |
| XXXVII | 12 | 17.2 | 47.6 |
| XXXVIII | 16 | 21.0 | 54.0 |
| XXXIX | 20 | 24.1 | 55.3 |
| XXXX | 24 | 28.3 | 58.6 |

EXAMPLE XXXXI

Samples of sugar maple (Acer saccharum) of approximately the same size as the wafers of Examples I–VIII were held under a vacuum of from 5 to 10 mm. Hg for about ten minutes followed by complete immersion in a solution of APO in 1,1,1-trichloroethane. The vacuum was released and the samples were allowed to soak in the APO solutions for 15 minutes. The moisture content of the wood employed was 9.5 percent based upon the oven-dry weight of the wood. Solutions of 5 percent and 15 percent (by weight) of APO in 1,1,1-trichloroethane were used. The impregnated blocks were vapor-cured in xylene at 138°–140° C. for two hours. The results are summarized in Table 6.

*Table 6*

| Concentration of APO in treating solution (percent by weight) | Retention of APO in wood (percent) | Antishrink efficiency (percent) |
|---|---|---|
| 5 | 8.40 | 25.5 |
| 5 | 6.68 | 18.2 |
| 15 | 18.00 | 54.1 |
| 15 | 20.20 | 54.7 |

EXAMPLE XXXXII

Ponderosa pine with a moisture content of 8, 12 and 20 percent by weight was treated with solutions of APO in xylene. The samples were vacuum impregnated by holding the samples under a vacuum of from 5 to 10 mm. of Hg for about 10 minutes, releasing the vacuum, and immersing the samples in a solution of APO in xylene for 15 minutes. The impregnated blocks were sealed in bottles and held at 80° C. for 16 hours to allow polymerization to begin in situ. The xylene was allowed to evaporate and the blocks were cured for 16 hours at 110° C. The results are summarized in Table 7.

Table 7

| Moisture content (percent by weight) | Concentration of APO in treating solution (percent) | Retention of APO in wood (percent) | Antishrink efficiency |
|---|---|---|---|
| 7.7 | 5 | 9.7 | 24.7 |
|  | 15 | 24.2 | 46.0 |
| 11.9 | 5 | 11.1 | 27.4 |
|  | 15 | 27.6 | 45.7 |
| 18.7 | 5 | 27.0 | 13.0 |
|  | 15 | 40.6 | 33.4 |

EXAMPLE XXXXIII

Samples of Ponderosa pine and sugar maple were impregnated with APO dissolved in "Chlorothene" (inhibited 1,1,1-trichloroethane) by vacuum treatment for about 10 minutes followed by release by the vacuum and immersion in the APO solutions for 15 minutes. The impregnated blocks were cured in xylene vapors for a two-hour period. The 1,1,1-trichloroethane was easily separated for re-use. The pine had a moisture content of 11.5 percent and the maple had a moisture content of 9.5 percent. Comparative results are summarized in Table 8. Results for the sugar maple treatment are the same as those recorded in Table 6, except that the average of two specimens are recorded in Table 8.

Table 8

| Species | Concentration of APO in treating solution (percent by weight) | Retention of APO in wood (percent) | Antishrink efficiency (percent) |
|---|---|---|---|
| Pine | 0 | 1.7 | 4.47 |
|  | 5 | 14.3 | 30.4 |
|  | 15 | 30.4 | 49.7 |
| Maple | 0 | 1.4 | 5.25 |
|  | 5 | 7.5 | 21.85 |
|  | 15 | 19.1 | 54.4 |

I claim as my invention:

1. A process for preparing dimensionally stable wood which comprises contacting wood with a moisture content above about 5 percent by weight with a solution of tris-(1-aziridinyl)-phosphine oxide in a non-aqueous solvent with a boiling point below about 150° C. to impregnate the wood with the solution, and then curing the impregnated wood to polymerize the tris-(1-aziridinyl)-phosphine oxide within the wood to obtain a wood product which contains from 5 percent to 50 percent by weight of tris-(1-aziridinyl)phosphine oxide polymerized within the fibers of the wood.

2. The process of claim 1 wherein the wood is cured in the vapor of a non-aqueous solvent with a boiling point below about 150° C.

3. A process for preparing dimensionally stable wood which comprises.
   (a) contacting wood with a moisture content of from 5 percent to 25 percent with a solution of tris-(1-aziridinyl)-phosphine oxide in a non-aqueous solvent with a boiling point below about 150° C. for from 5 minutes to 24 hours to obtain a product impregnated with monomeric tris-(1-aziridinyl)-phosphine oxide; and
   (b) curing the impregnated product from (a) at a temperature of from 45° to 150° C. in the presence of the vapor of said non-aqueous solvent to obtain a wood product which contains from 5 percent to 50 percent by weight of tris-(1-aziridinyl)-phosphine oxide polymerized within the fibers of the wood.

4. A wood product prepared according to the process of claim 1 which contains from 5 percent to 50 percent by weight of tris-(1-aziridinyl)-phosphine oxide polymerized within the fibers of the wood.

References Cited by the Examiner

UNITED STATES PATENTS

| 2,886,539 | 5/1959 | Drake et al. | 117—136 XR |
| 2,891,877 | 6/1959 | Chance et al. | 177—136 |
| 3,146,228 | 8/1964 | Chance | 206—2 |
| 3,160,515 | 12/1964 | Goldstein et al. | 117—136 |

FOREIGN PATENTS

| 914,325 | 5/1954 | Germany. |

WILLIAM D. MARTIN, *Primary Examiner.*
MURRAY KATZ, *Examiner.*